United States Patent
Lammers

(10) Patent No.: US 8,253,771 B2
(45) Date of Patent: Aug. 28, 2012

(54) VIDEO CALL MANAGEMENT APPARATUS AND ASSOCIATED METHODOLOGY OF CONTROLLING VOICE AND VIDEO RESPONSE

(75) Inventor: Wouter Lammers, Lysaker (NO)

(73) Assignee: Cisco Technology, Inc., San Jose, CA (US)

( * ) Notice: Subject to any disclaimer, the term of this patent is extended or adjusted under 35 U.S.C. 154(b) by 1023 days.

(21) Appl. No.: 12/183,510

(22) Filed: Jul. 31, 2008

(65) Prior Publication Data

US 2009/0051752 A1 Feb. 26, 2009

Related U.S. Application Data

(60) Provisional application No. 60/953,007, filed on Jul. 31, 2007.

(51) Int. Cl.
*H04N 7/14* (2006.01)
*H04M 3/00* (2006.01)
*H04M 5/00* (2006.01)

(52) U.S. Cl. ............................ 348/14.01; 379/265.11

(58) Field of Classification Search .... 348/14.01–14.03, 348/14.08; 379/265.01, 265.02, 265.05–265.09, 379/265.11, 266.01
See application file for complete search history.

(56) References Cited

U.S. PATENT DOCUMENTS

| | | | |
|---|---|---|---|
| 5,793,861 A | 8/1998 | Haigh | |
| 2002/0169824 A1 | 11/2002 | Dettinger | |
| 2004/0208309 A1 | 10/2004 | Miloslavsky | |
| 2005/0128961 A1 | 6/2005 | Miloslavsky et al. | |

FOREIGN PATENT DOCUMENTS

| | | |
|---|---|---|
| WO | WO 99/41720 | 8/1999 |
| WO | WO 2004/010672 A2 | 1/2004 |
| WO | WO 2004/038978 A2 | 5/2004 |

*Primary Examiner* — Tuan Nguyen
(74) *Attorney, Agent, or Firm* — Oblon, Spivak, McClelland, Maier & Neustadt, L.L.P.

(57) ABSTRACT

An video call management apparatus and associated methodology of controlling interactive voice and video responses is provided. A calling party is identified as an agent or a caller based on a set of agent identities. The calling party is then provided with an agent main menu, when an agent is identified, or a caller main menu when a caller is identified. An agent can be connected to the caller in a sub-queue entry, and a caller can be placed in an existing sub-queue or a new sub-queue can be created if it does not exist. Videomail from a caller for playback to an agent is also received, and the agent may call the caller during or after playback of the videomail. The agent is presented with a system video message containing information and statistics on a completed call.

23 Claims, 12 Drawing Sheets

VIDEO CALL MANAGEMENT APPARATUS AND ASSOCIATED METHODOLOGY OF CONTROLLING VOICE AND VIDEO RESPONSE

CROSS REFERENCE TO RELATED APPLICATIONS

The present application is based upon and claims the benefit of priority from U.S. Application No. 60/953,007 filed on Jul. 31, 2007, the entire contents of which are incorporated herein by reference.

BACKGROUND

The present advancements relate to Video Call Centers and associated methodology of controlling Interactive Voice and Video Responses. Video calls are increasingly becoming the preferred form of remote real-time communication. The proliferation of video-enabled devices and the rapid growth in available bandwidth are making conversational video increasingly available to businesses and consumers alike.

The rise of conversational video creates new demands for businesses and telecom service providers. As the number of video-equipped consumers increase, the demand for video-enabled services also increases. Moreover, video calls are no longer limited to advanced endpoints specifically adapted for video conferencing. Video calls can also be facilitated from cell phones and PC's. As real-time communication is emerging from audio only towards multimedia communication, there is an increasing need for adapting common services, optimized for audio calls only, to services where the benefits of real-time video are also used. Some of the most developed services in this context are call centers.

A call center is a centralized office used for the purpose of receiving and transmitting a large volume of requests by phone. A call center is usually operated by a company to administer incoming product support or information inquiries from consumers. Outgoing calls, for example, for telemarketing, clientele, and debt collection are also made.

A call centre is often operated through an extensive open workspace for call center agents with work stations that include a computer for each agent, a telephone set/headset connected to a telecom switch, and one or more supervisor stations. The call center can be independently operated or networked with additional centers, often linked to a corporate computer network, including mainframes, microcomputers and LANs. Increasingly, the voice and data pathways into the centre are linked through a set of new technologies called computer telephony integration (CTI); this also includes linking with e-mail, databases and web-based services.

Most major businesses use call centers to interact with their customers. Business applications for call centers are virtually unlimited in the types of transactions that they can accommodate. Call centers can support, for example, sales, including order entry, order inquiry, and reservations; financial services, including funds transfer, credit card verification, and stock transactions; information services, including event schedules, referral services, transportation schedules, and yellow pages; and customer services, including technical support, repair dispatch, and claims handling. Examples of businesses that use call centers include utility companies, mail order catalogue firms, and customer support for computer hardware and software. Some businesses even service internal functions, such as help desks and sales support, through call centers.

Call centers include some sort of switching network, ranging from dedicated circuit switches to using IP multimedia technologies, such as voice and video over IP. The call center can be modeled as a number of queues. The callers can join a queue based on, for example, a menu choice, or from information known about the caller, such as the geographical location derived from the caller's country code, or the phone number called. The agents can serve queues based on various techniques known as Automatic Call Distribution or Skill-based routing, where, for example, the agent's knowledge of languages is taken into account together with other factors such as response time.

The benefits to call centers adopting video communication are relatively obvious. For example, videophone customer service allows customers to see the agent when they call for assistance. Video services that benefit users are needed to enhance the uptake rate for videophones. Offering hosted video call center services will give enterprises a way to create their own video call centers quickly and cost effectively, further fueling the demand for video calling.

IVVR (Interactive Video and Voice Response) is the extension of IVR (Interactive Voice Response) by the addition of video. IVVR adds a new multimodal dimension to the caller experience. In addition to hearing traditional IVR voice menus and announcements, a caller can see menu choices to expedite the call, and receive video presentations while waiting for an agent, during transfers, or at other appropriate places in the IVVR dialogue. This creates new service and revenue possibilities ranging from ad-subsidized free information, to paid entertainment, and more.

IVVR can be used as a video front-end to a traditional voice call center, or as part of a video call center where callers see agents and vice versa when callers are so equipped. Call centers that can't be immediately upgraded to video can still offer IVVR to video-enable the self-service portion of the call and then transfer the call to a voice agent in the legacy call center. In call centers that can upgrade to video, IVVR is the video-enabled prelude and gateway to the video agents.

The use of video and web technology in call centers is known. U.S. Pat. No. 6,404,747: Integrated audio and video agent system in an automatic call distribution environment, teaches a general solution for a video multimedia call center. U.S. Pat. No. 6,389,132: Multi-tasking, web-based call center, teaches a web-based call center. None of these patents provide a simple and flexible method to identify an agent that calls into the queue; instead they build on the assumption that the agents are called by the automatic call distributor.

Virtual worlds such as There by Makena, Alphaworld by Activeworlds and Second Life by Linden Labs are platforms increasingly used for communication. In such worlds persons are represented by an avatar, i.e. a graphical 3D representation that can be animated. The avatar can usually walk or fly. For going from one location to another in a virtual world, teleportation is commonly used, i.e. the computer controlling the world simply moves the avatar to a new location based on input from the user. The location can e.g. be given as a combination of coordinates and place names. For a business setting up a center in a virtual world there is a need to establish a call center or to integrate existing call centre functions with the presence in the virtual world.

BRIEF DESCRIPTION OF THE DRAWINGS

A more complete appreciation of the inventions and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

DETAILED DESCRIPTION

In the following, the present advancement will be discussed by describing a preferred embodiment, and by referring to the accompanying drawings. An embodiment applicable for virtual worlds such as Second Life is also described. However, people skilled in the art will realize other applications and modifications within the scope of the invention as defined in the enclosed independent claims.

The method and video call management device for a common point of handling and managing callers and agents in an IVVR is provided for a simple access and user friendly User Interface to a call center. Agents can use the same number to configure their status for a queue as callers use to access that queue, and the service compares the number of the calling party to the agent numbers supplied in the dialplan entry arguments. In this way, both video and audio callers can use the call centre, and the device detects what kind of user is calling in, and gives them the right interface. Further, queues can be created by making an instance (dialplan entry) of the Queue service, configuring the queue by using dial plan entry arguments. Every queue has a separate phone number, or similar identifier, and callers and agents can reach queues through a menu or dial the queue phone number directly.

Figure 1:
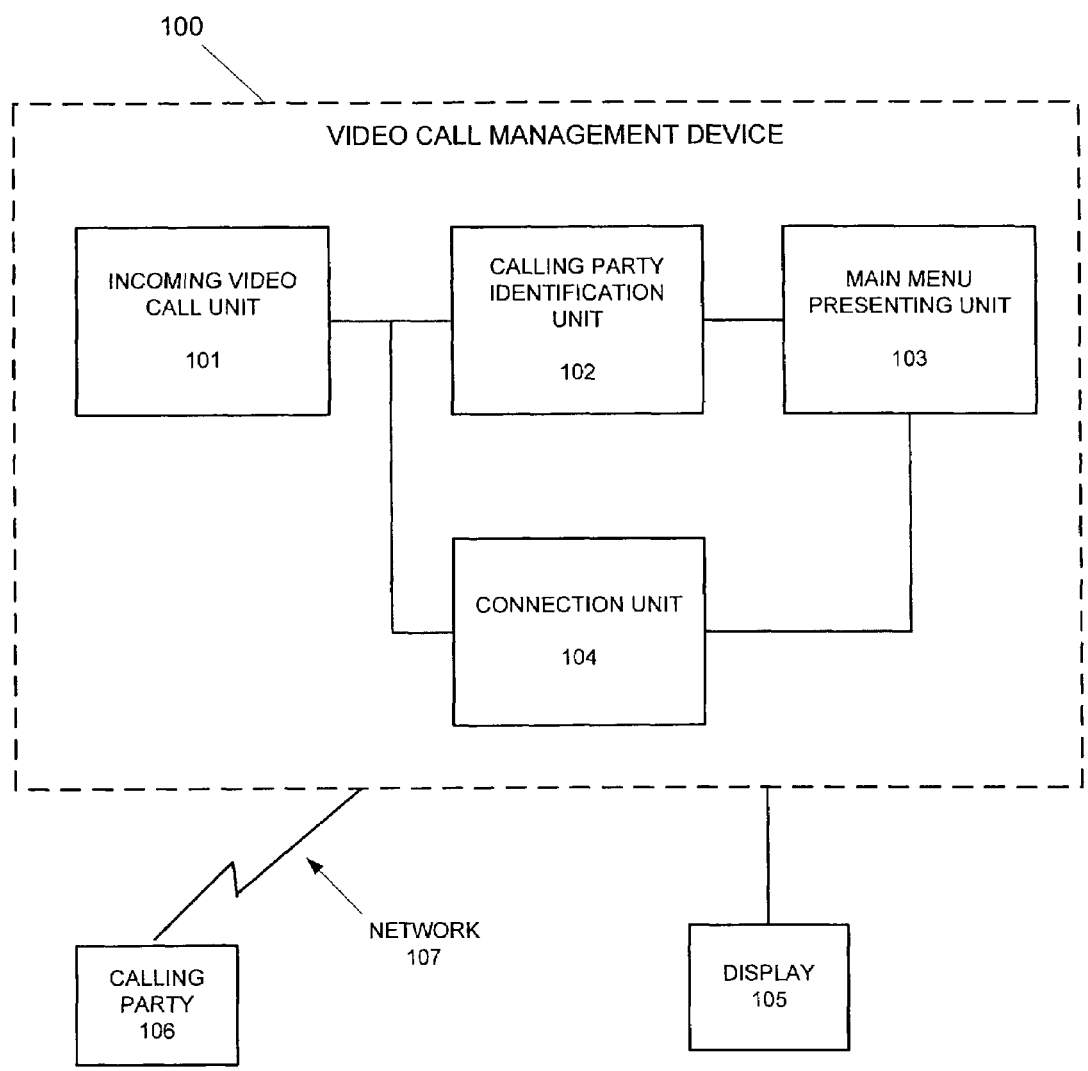
FIG. 1 is a block diagram of a video call management device in accordance with an exemplary aspect of the invention.

In FIG. 1, the video call management device 100 is connected via a network 107 to a calling party 106, and is also connected to a display for displaying information as described below.

The network 107 in FIG. 1 can be, for example, a wide area network (WAN), a wireless wide area network (WWLAN) or a circuit-switched telephone network such as an Integrated Digital Services Network (ISDN). Further, the network 107 can be a public network such as the Internet, a hybrid network (partly public and partly private) or a dedicated network. If the network 107 is wireless, radio network access can include Global System for Mobile communication (GSM), General Packet Radio Services (GPRS), Enhanced Data GSM Environment (EDGE), Code Division Multiple Access (CDMA), and the like.

The display 105 of FIG. 1 can be, for example, a display for data input and/or for communicating with regular (e.g. H232) videoconferencing endpoints, such as computer graphics, televisions and the like.

The video call management device 100 of FIG. 1 includes an incoming video call unit 101, a calling party identification unit 102, a main menu presenting unit 103, and a connection unit 104. In the exemplary embodiment, units 101-104 are implemented in a single computer executable instruction set of a data processor of the video call management device 100, not shown. Units 101 to 104 may be housed within a single personal computing device, or may be implemented separately on FPGA's, ASIC's, microcontrollers PLD's or other computer readable medium such as an optical disk.

The exemplary video call management device 100 of FIG. 1 is a hardware platform of a personal computing device such as a PC employing an Intel Pentium Processor. The instruction set of units 101-104 may be provided as a utility application, background daemon, or component of an operating system, or combination thereof executing in conjunction with a processor and operating system such as Microsoft VISTA®, Unix, Solaris, Linux, Apple MAC-OS and other systems known to those skilled in the art.

Memory required for supporting the registries and like features of the video call management device 100 of FIG. 1 is omitted as well known. Likewise a description of the general features of the video call management device 100 such as volatile and/or non-volatile memory, I/O capabilities, common peripheral devices, as well as corresponding functionality have been omitted for brevity. The specific coding and porting of the algorithms described herein is within the ability of one skilled in the art upon review of the specification and drawings.

Figure 2:
FIG. 2 is a screen shot of a graphical user configuration interface of a Basic Call Center Manager, in accordance with an exemplary aspect of the invention.
Figure 3:
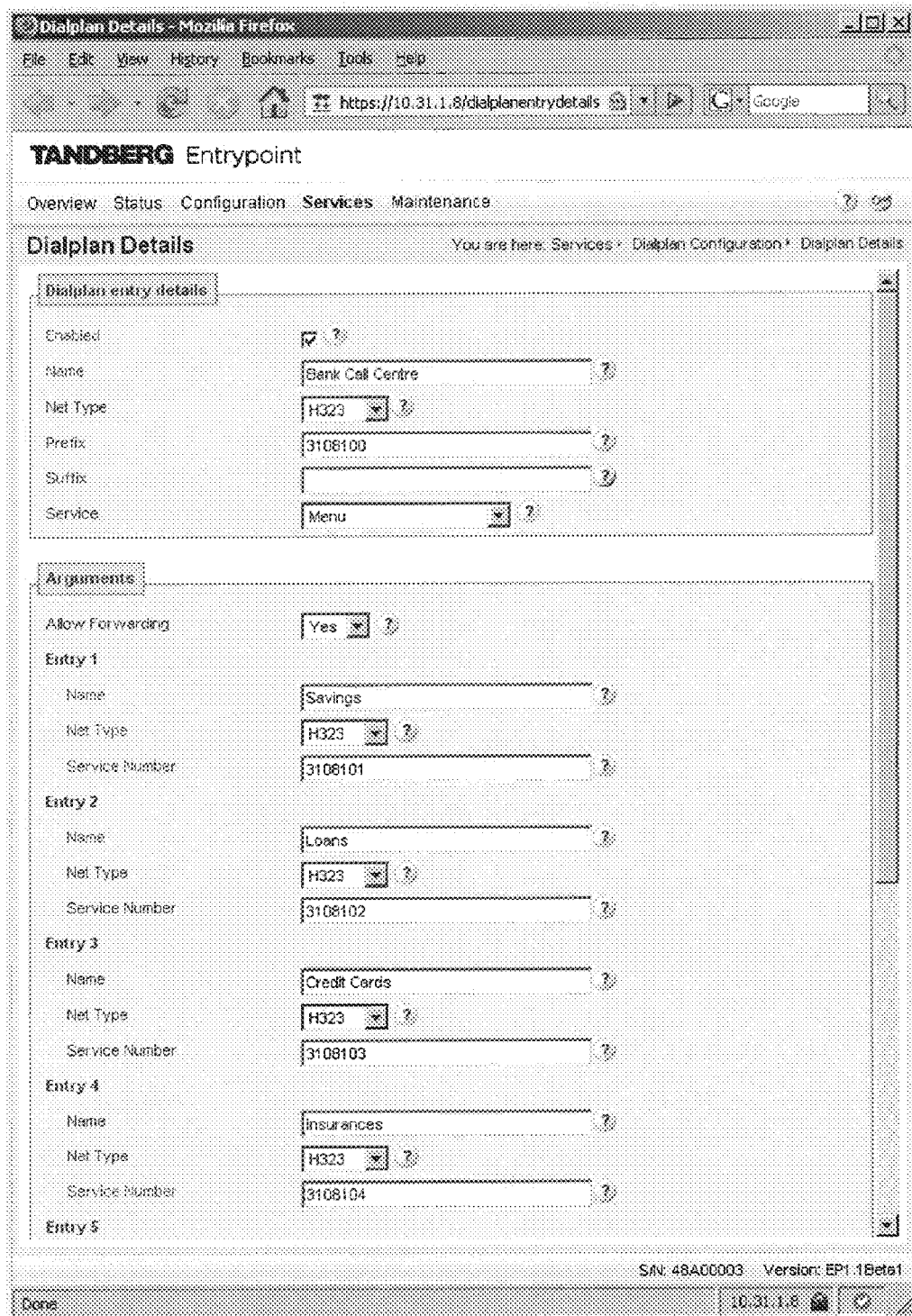
FIG. 3 is another screen shot of a graphical user configuration interface of a Basic Call Center Manager, in accordance with an exemplary aspect of the invention.
Figure 4:
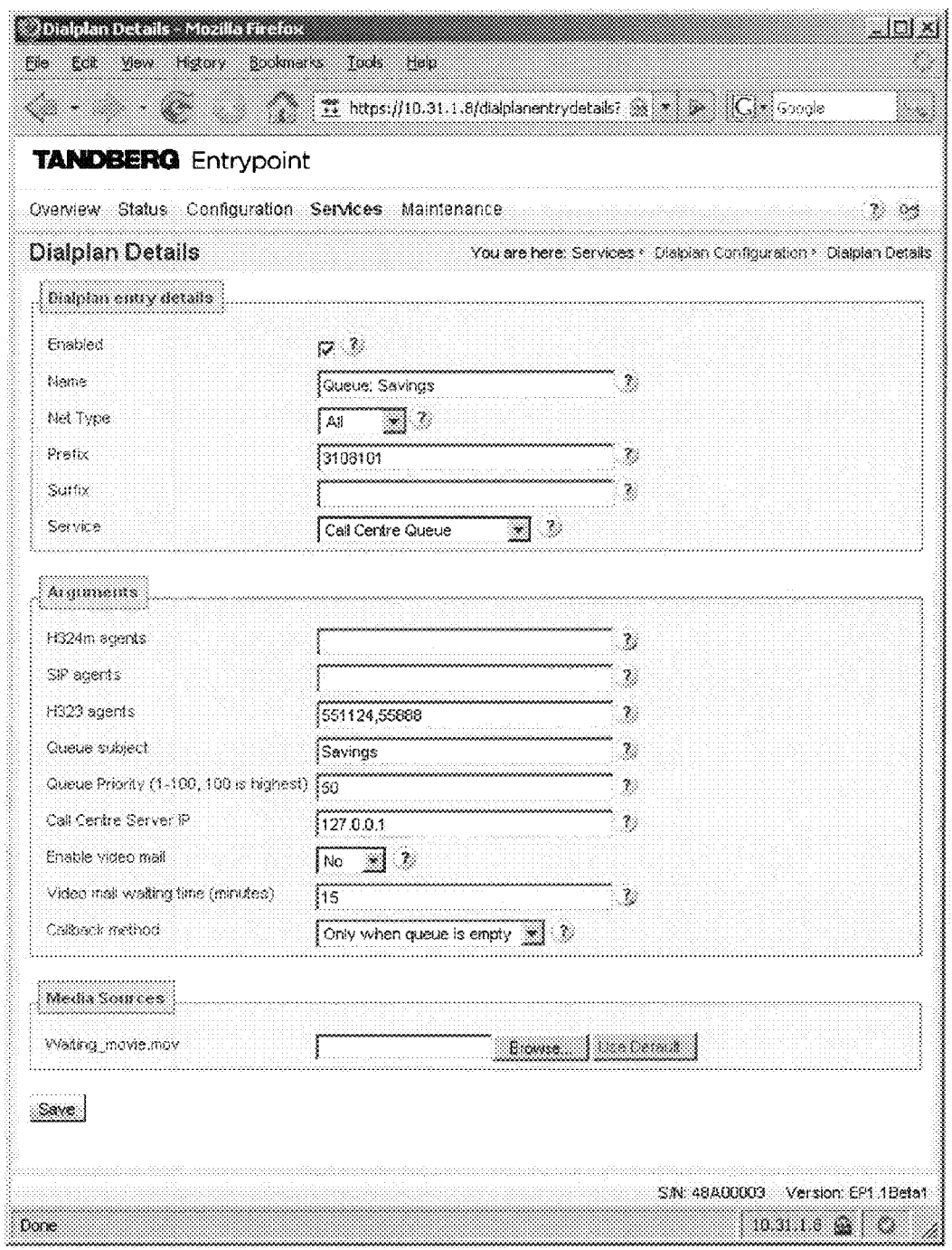
FIG. 4 is a third screen shot of a graphical user configuration interface of a Basic Call Center Manager, in accordance with an exemplary aspect of the invention.

The present advancement will preferably require some kind of pre-configuration to work properly. FIGS. 2, 3 and 4 show some examples entries that may be required to enter in the User Interface of a call centre to create a dial plan and a number of corresponding queues.

FIG. 2 shows an example of a dial plan where the numbers of each of the queues of the call centre is associated with the queue name and service type. For example, by dialing 3108100, a caller will reach a menu appearing on his video screen with options to select which queue to enter. A user can also dial a queue directly if he knows the number of the queue. For example, dialing 3108101 will bring the caller directly to the "Savings" queue. An administrator can manage the entries in the call centre through the web interface by creating new entries and deleting old ones, and changing the settings for existing entries.

An extended editing of the dial plan is shown in FIG. 3. The entry "Bank call centre" is set as a menu service, and will then be the top level of a number of queues. Net type is selected to be H.323, meaning that this entry is enabled to receive video calls, and since it also is a menu entry, it will as already mentioned provide a visual menu for the video callers. Below the top level, a number of queues and their respective settings are listed. All these queues will be selectable for a caller dialing the menu number, and all the queues in this example are enabled to receive video calls. This means that agents and callers entering the queues can be connected in video calls if both are using a video terminal. Optionally, there could also be attached an on-hold video to each queue entry to be shown when the callers are waiting to be connected with an available agent. The connection between callers and agents can be managed by an Automatic Call Distributor or using skill based routing or other techniques for automatic management of queues. Based on this, the caller can also receive an estimated time before the call is placed with an agent by audio or video. A video or a voice mail and a call back option could also be associated with each queue, or at the menu level, to give the callers the possibility to leave a message or the phone number, and the agent the possibility to call back the callers who have left the queues.

FIG. 4 shows further extended editing of the dial plan. In this window, dial plan details of a separate queue are specified. In this part of the dial plan, the agents are specified by, for example, dial numbers in the agent entries. The specification of agents will allow the system to differentiate agent-originated calls from other calls.

When all the entries and the associated settings are entered in to the Basic Call Centre Manager, the Call Centre is ready for use. Callers can use the menu service to choose a subject or dial a queue service directly, and agents can also use the menu service or dial a queue directly to set their status and to connect to one of the callers.

In the following description, any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

Figure 5:
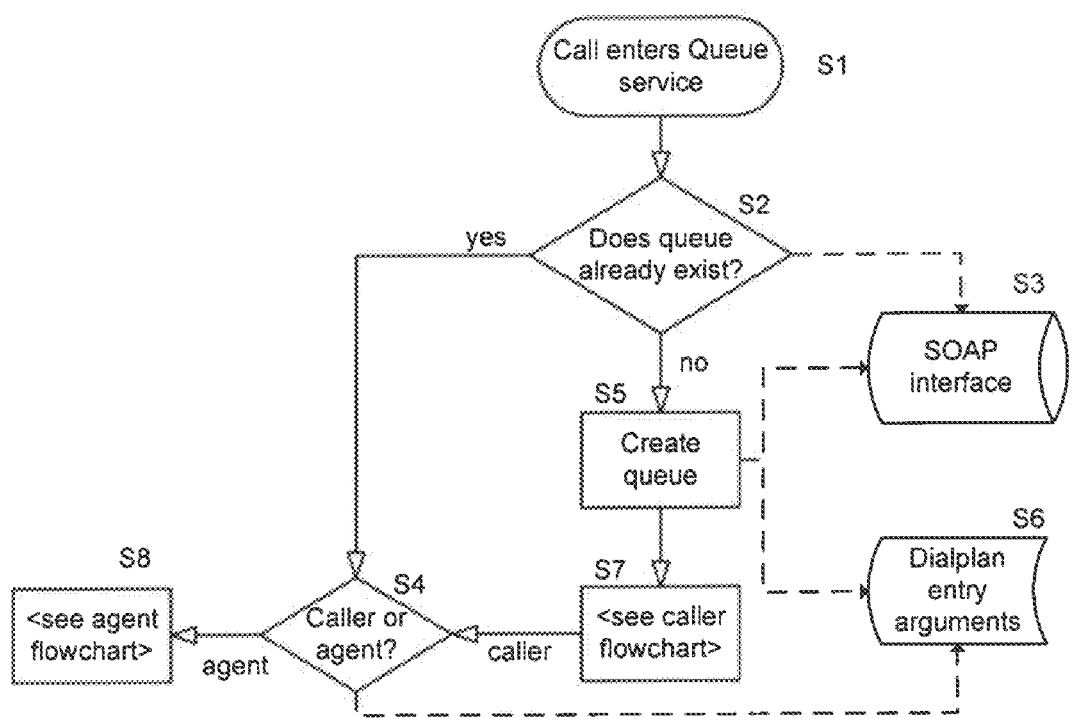
FIG. 5 is a flow chart illustrating the beginning of a call flow, in accordance with an exemplary aspect of the invention.

FIG. 5 shows a call flow chart illustrating the beginning of a call when a caller enters a queue service according to the present invention by calling one of the numbers defined in the Basic Call Centre Manager. In S1, the calling party enters the queue service and selects a queue. In S2, whether the selected queue exists is determined, using a Simple Object Access Protocol (SOAP) Interface S3. If the selected queue exists, the identity of the calling party is identified as a caller or an agent in S4 by comparing the number of the calling party with those stored in the Dialplan entry arguments S6. If the calling party is an agent, the agent flowchart S8 is entered. If the calling party is a caller, the caller flowchart S7 is entered. Both the agent flowchart S8 and the caller flowchart S7 will be described in detail below.

If the selected queue does not exist, it is created in S5, and recorded in the SOAP Interface S3 and the Dialplan entry arguments S6.

Figure 6:
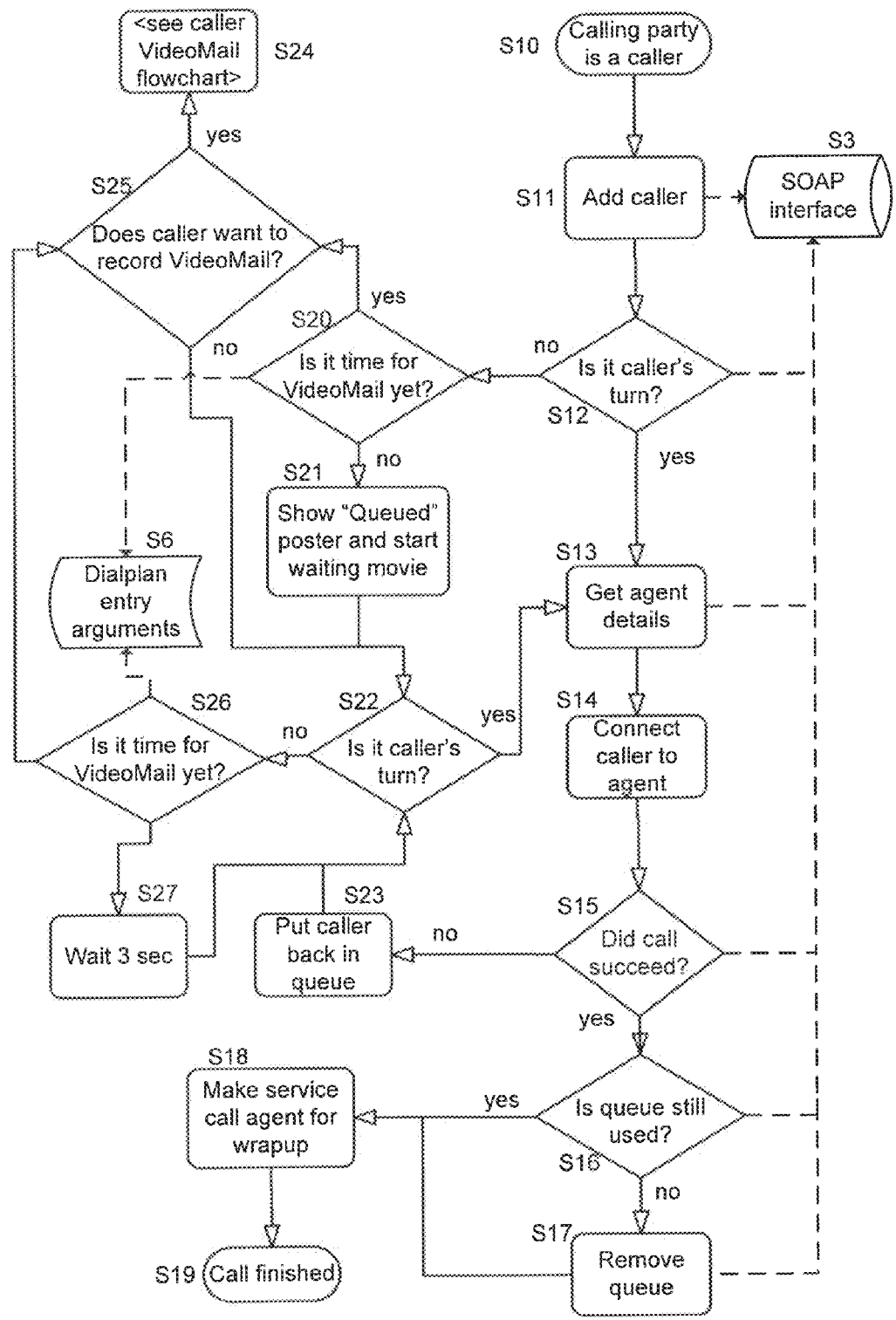
FIG. 6 is a flow chart illustrating a call flow when the calling party is determined to be a caller, in accordance with an exemplary aspect of the invention.

FIG. 6 shows a call flow chart illustrating the flow when the calling party is determined to be a caller. Once the calling party is determined to be a caller, the flow is entered at S10. The caller is registered at S11 to the SOAP Interface S3. Then the flow determines whether it is the caller's turn at S12. If it is, the agent details are retrieved at S13. Then the caller is connected to the agent at S14, and both the status of the caller and that of the agent are changed to "Conversation". Next, it is determined whether the call was successful S15 in accordance with a CaseValue that determines whether the call ended normally or whether there was an error (e.g., agent endpoint busy.) If so, the flow checks to see if the queue is still being used by other callers S16. If it is, the flow wraps up the call S18 and the call is finished S19. If, however, there are no more callers using the queue, the queue is removed S17 before wrapping up S18 and finishing S19 the call.

If the call was unsuccessful, the caller is placed back into the queue S23, and the flow described below ensues.

The above describes the flow when it is the caller's turn. However, if at S12 it is determined that it is not the caller's turn, whether videomail can be recorded is determined at S20. If videomail can be recorded, whether the caller would like to leave a videomail is determined S25, and if the caller would, the flow enters the videomail flowchart S24.

If at S20 it is determined that videomail cannot be recorded, the caller is shown a waiting movie S21. After this, the flow checks whether it is the caller's turn S22 and if not, re-checks whether voicemail can be recorded S26. After 3 seconds S27 this cycle repeats until voicemail can be recorded, or it's the caller's turn.

Figure 7:
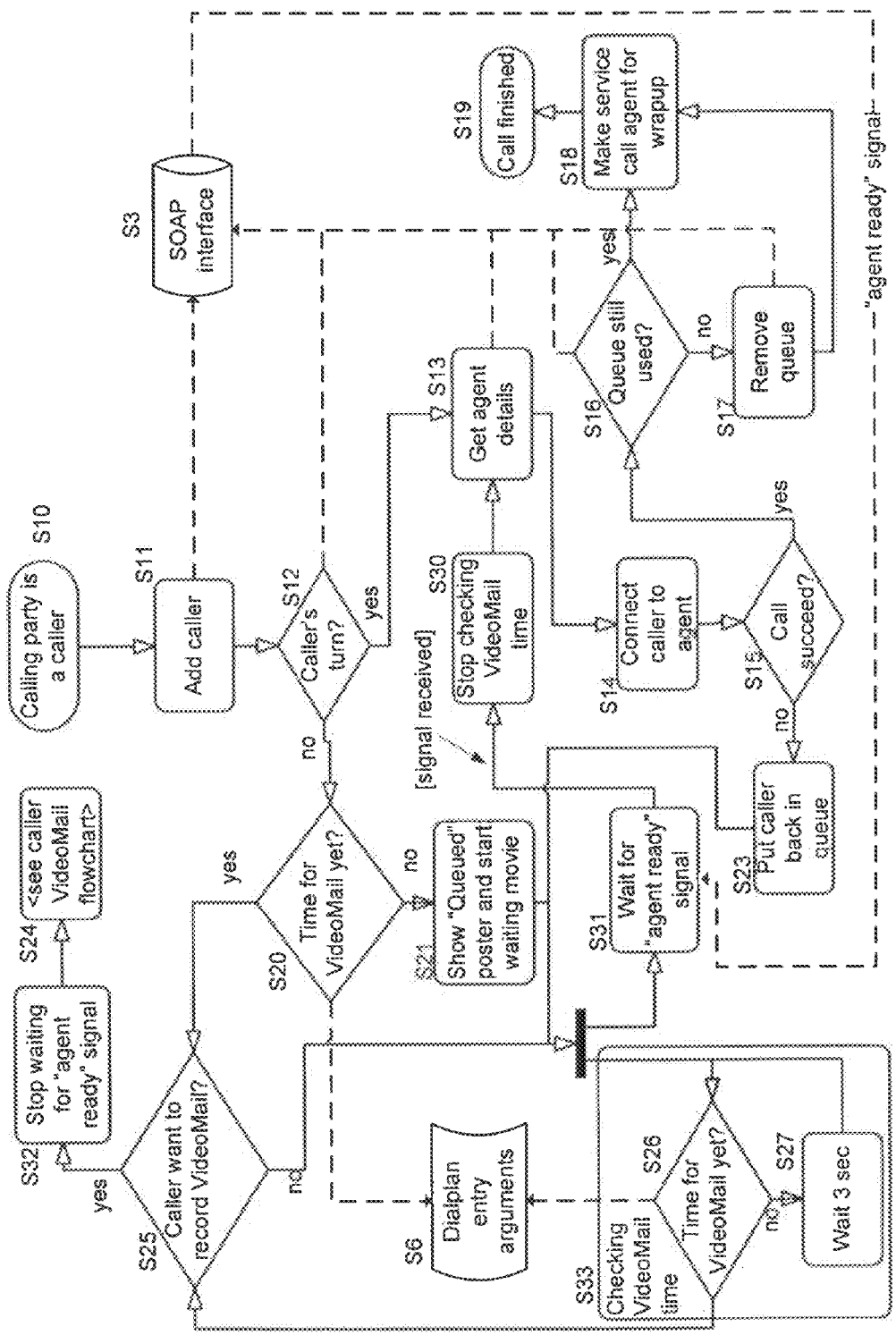
FIG. 7 is a flow chart illustrating an alternative flow when the calling party is determined to be a caller, in accordance with an exemplary aspect of the invention.

In the example of FIG. 6, the queue service regularly polls on behalf of the caller whether it is the callers turn to connect with an agent. FIG. 7 shows an alternative flow that can also be used when the calling party is determined to be a caller. The flowchart illustrated in FIG. 7 is nearly the same as that of FIG. 6 and functions in nearly the same way. Therefore, only the differences will be described, for brevity. In FIG. 7, an "agent ready" signal is transmitted from the SOAP Interface S3 to the "Wait for agent signal" module S31. Thus, in this variation, the caller IVVR doesn't have to poll the SOAP interface to determine if an agent is ready. Instead, the caller IVVR waits for an "agent ready" signal from the Call Centre. The IVVR still checks if the caller has waited in line long enough to be able to leave a Videomail message, but this is done internally and doesn't require SOAP messages.

In both FIGS. 6 and 7 the call is finished after "make service call agent for wrap-up" S18. After each call an agent is called by the system and presented with information on the call. This provides the agent with key data such as length of the call, caller id, queue and sub-queue served, and could also provide the agent with information on the outcome of call, confirm storage, statistical information on the agent's and call center performance, such as Average Delay, Average Talk Time, Average Handling Time, Service Level percentage, Calls Per Hour handled by agent and center, Not Ready Time, First Call Resolution numbers, Total Calls Abandoned and Idle Time.

The information can be shown as text and graphics within the video stream from the call centre to the agent, or in combination with web pages, web feeds such as RSS or e-mail. In the present embodiment as shown in FIGS. 6 and 7 the system knows that the agent is occupied while reading the information, until the agent releases the call.

Figure 8:
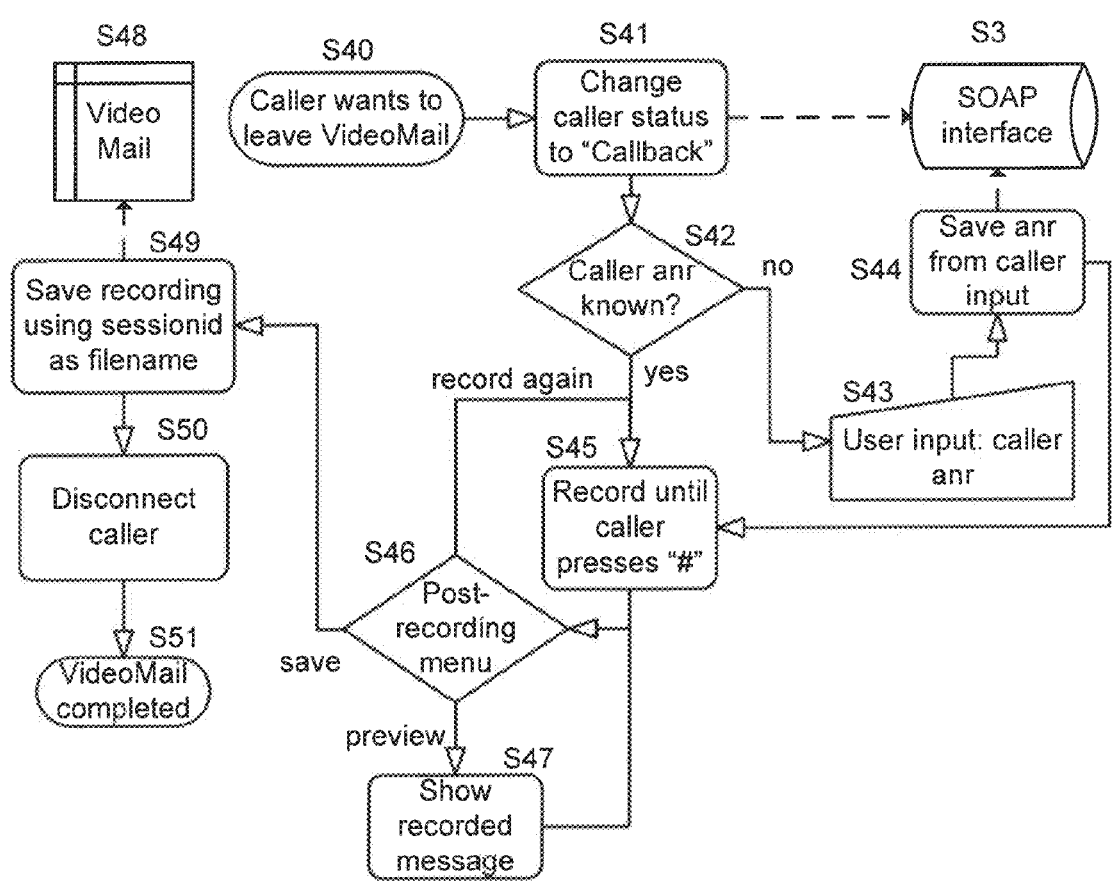
FIG. 8 is a flow chart illustrating details in the call flow in the case of a caller leaving a Video Message, in accordance with an exemplary aspect of the invention.

FIG. 8 shows the details in the call flow in the case of a caller leaving a Video Message. The caller enters the flowchart at S40. If a caller chooses to leave a Videomail message and wait for an agent to call him back instead of staying in the waiting queue, his status is changed to "Callback" S41. If the number (anr) of the calling party is not known, the user is prompted to enter a preferred number (anr) S43 which will be stored S44 in the SOAP Interface S3. The recording of the video message is then started and kept in progress until the user presses "#" S45. Alternatively, the caller may choose to only leave a predefined request for a callback S47. The caller is then presented for a post-recording menu S46, the Videomail is saved S49 to videomail S48, and the connection with the caller is terminated S50. The caller keeps his position in the queue, and a callback will be carried out by an available agent when the caller reach the first position in the queue.

Figure 9:
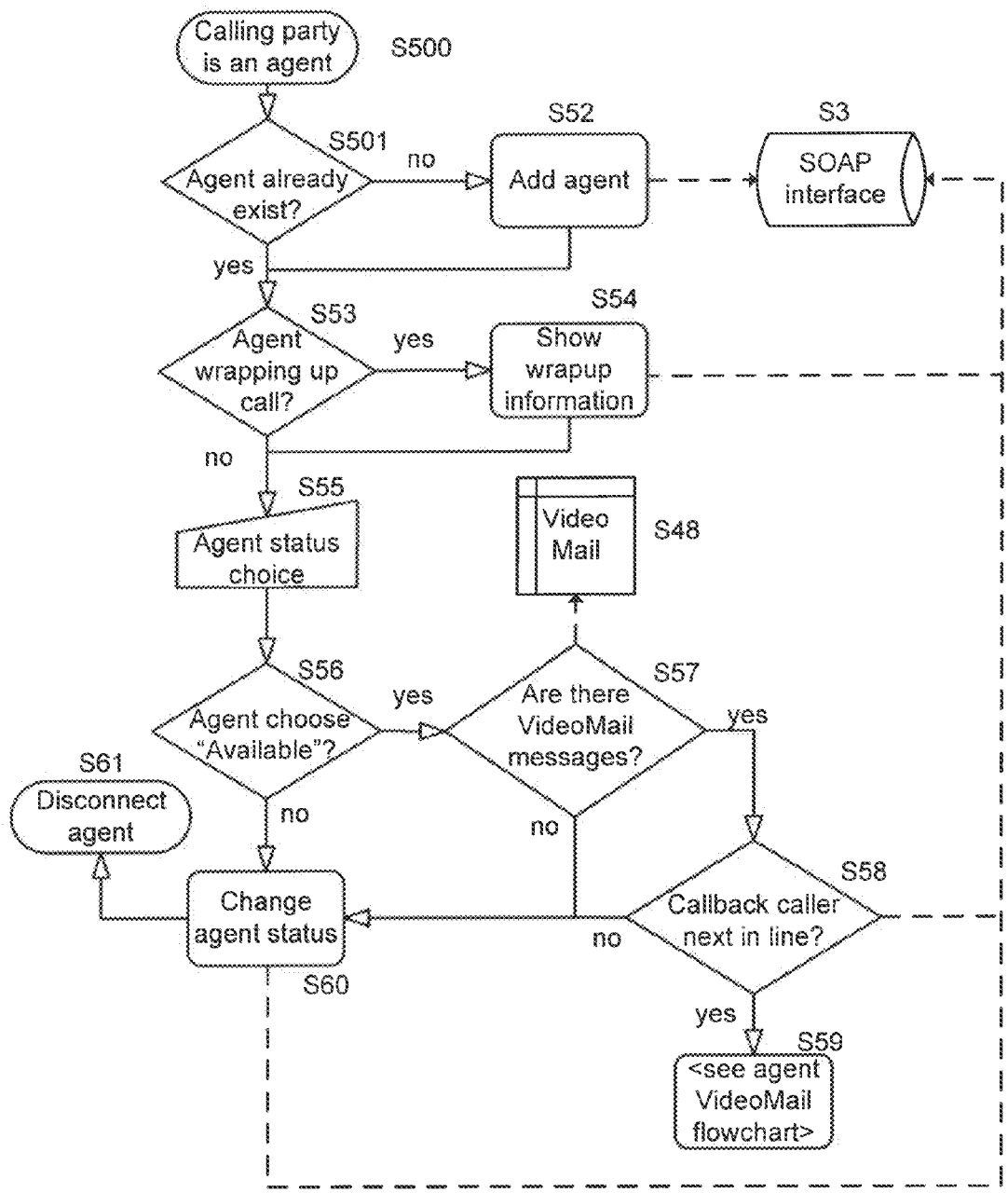
FIG. 9 is a flow chart illustrating the flow when the calling party is determined to be an agent, in accordance with an exemplary aspect of the invention.

FIG. 9 shows a call flow chart illustrating the flow when the calling party is agent S500. First, whether the agent already exists is determined S501. If the agent does not exist, he or she is added to the SOAP Interface S3 in module S52. If the agent does exist, it is determined whether the agent is wrapping up a call S53. If so, the wrap-up information is shown S54. If the agent is not wrapping up a call, the agent is presented with a choice of status S55 including "Available" or "Not Available." If the agent chooses the status of "Available" in S56, it is determined whether there are videomail messages in S57 by checking Videomail S48. If there are videomail messages, it is determined whether the callback caller is next in line S58, and if so, the agent is sent to the Videomail flowchart S59. If there are no videomail messages, the callback caller is not next in line, or the agent does not choose the status of "Available", the agent's status is changed in S60, and the agent is disconnected at S61.

Figure 10:
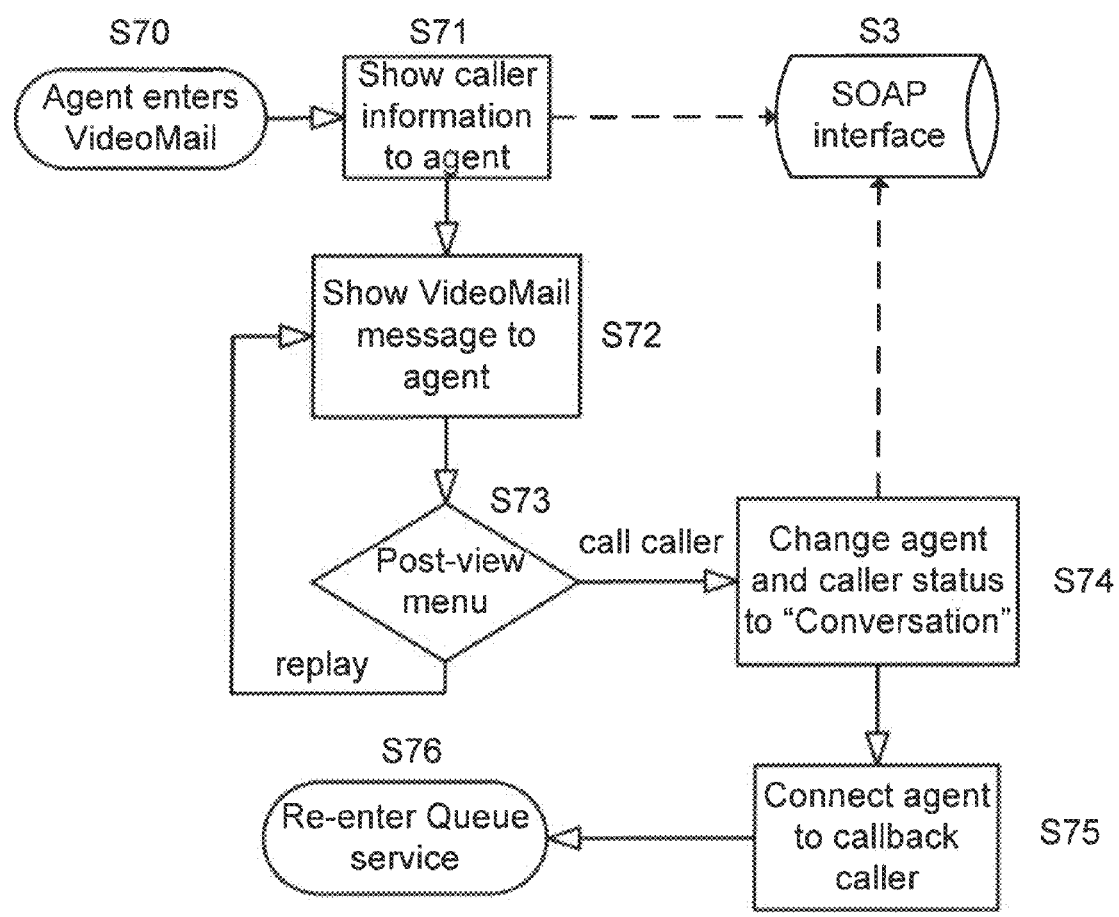
FIG. 10 is a flow chart illustrating the call flow when an agent enters into a queue having a VideoMail waiting, in accordance with an exemplary aspect of the invention.

FIG. 10 shows a flow chart illustrating the call flow of the case mentioned above, when an agent enters into a queue having a Videomail waiting. The agent enters at S70, and a screen with information of the caller who has left the message is shown to the agent at S71. This information is taken from the SOAP Interface S3. Next, the agent is shown the videomail message S72 In the Post-view menu S73, the agent can replay the message or connect to the caller who left it. If the agent chooses to connect to the caller, both the status of the agent and that of the caller are changed to "Conversation" in S74, and the agent is connected to the caller in S75. After the call is done, the agent is connected to the Queue service again S76, where he automatically gets the wrap-up information for the call.

Figure 11:
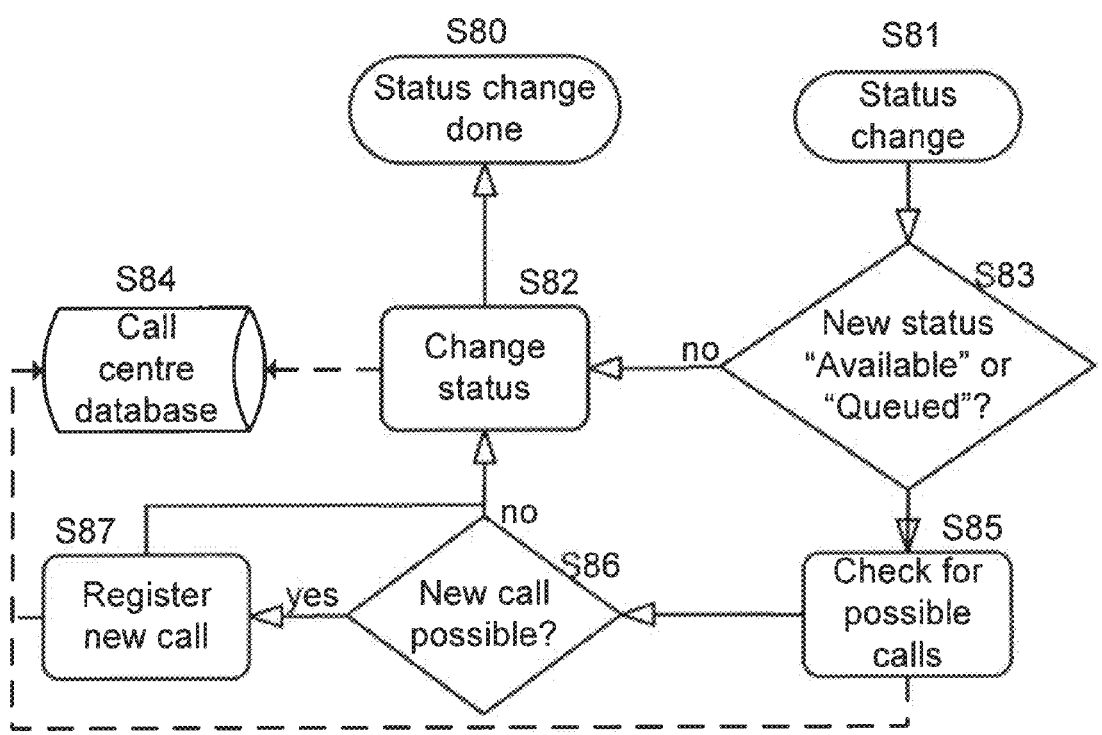
FIG. 11 is a flow chart illustrating how to check the possibility to connect callers to agents, in accordance with an exemplary aspect of the invention.

Every time an agent or a caller changes status, the SOAP interface checks for the possibility to connect callers to agents, as depicted in FIG. 11 for the case of the caller. The SOAP Interface first identifies a caller available for status change S81. Then it determines whether the new status will be "Available" or "Queued" S83. If the new status will be "Available", the SOAP Interface checks for the possibility of connecting the caller to an agent S85. If this is not possible, the status is changed to "Queued" and registered in the call center database S84. Then the status change is complete S80.

If, however, a new call can be established between an agent and a caller, the new call is registered S87 in the call center database S84. Then the status is changed S82 and the change is complete S80.

Figure 12:
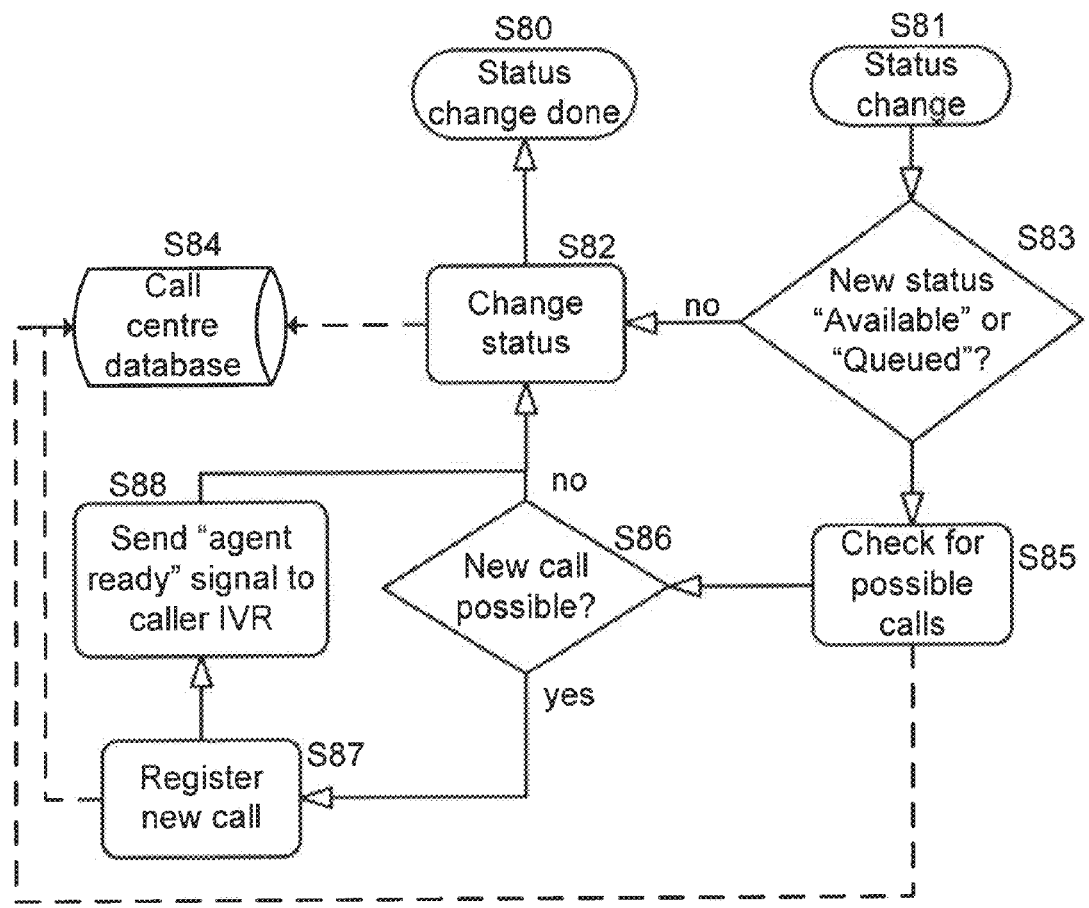
FIG. 12 is a flow chart illustrating how to check the possibility to connect agents to callers, in accordance with an exemplary aspect of the invention.

FIG. 12 shows the case of the status change for an agent. The process is entered at S81. Then it is determined whether the agent is "Available" S83. If the agent is available, the SOAP Interface checks for the possibility of making a new call between the agent and a caller S85 & S86. If it is possible, the new call is registered S87 in the call center database S84, and the "agent ready" signal is sent to the caller IVR S88. The status of the agent is changed S82 and the process ends S80. If, however, a new call is not possible or the agent is not "Available", the status of the agent is change S82 and the process ends S80.

In an other embodiment, the present invention is integrated with a virtual world such as Second Life. In virtual worlds there is usually a chat or a voice service that works between avatars within a reasonable distance of one another. In this embodiment the callers have avatars that are voice-enabled. They can be served by a call center in three ways (aside from the obvious text chat or instant messaging):

i) The caller avatar is served by an agent using voice only. The caller avatar is simply using a virtual telephone or voice enabled chat to contact the call center and join a queue there, as described in the previous embodiment.
  ii) The caller avatar is served by an agent using video. The caller avatar is simply using a virtual world device similar to a video phone as described in the previous embodiment.
  iii) The caller avatar is served by an agent avatar in the same or another virtual world.
   a. The caller avatar enters the queue service as in FIG. 5 by activating a teleport and thus selecting an address in the namespace of the relevant virtual world. This is similar to calling a number or selecting an URL in the previous embodiment.
   b. The caller and agent a reconnected as shown in FIGS. 6 and 7 "Connect caller to agent" by teleporting the caller and agent avatar to a suitable meeting location in a virtual world. The place can, for example, be a dedicated virtual call center office or any place chosen by the calling avatar or the agent avatar. The call is finished, "Call finished" in FIGS. 6 and 7, for example, when one of the avatars leaves the location or when the call is marked as finished in a Head-Up-Display. The call can also be ended by touching a button, giving a command or the similar. Preferably, there are arrangements for the avatars to leave the location, for example, to jointly explore a problem or view an object for sale.
   c. The "show Queued poster and start waiting movie" can be replaced by allowing the caller avatar to roam freely until teleported when "connect caller to agent".
   d. The use of Videomail is similar to that of the first embodiment, as shown in FIGS. 6, 7 and 8. The video of the caller avatar's message is recorded, and can be replayed by the agent. During the recording the caller's avatar may move or teleport in order to show or explain the purpose of the call. The agent views a Videomail as shown in FIG. 10.
   e. The agent calls in as in FIG. 9, by activating a teleport in the same manner as the caller. The agent is identified, for example, by an avatar name, as commonly used in virtual worlds.
   f. Changes in status are as for the first embodiment shown in FIGS. 11 and 12.

In this embodiment the Videomail that is recorded is a recording of the avatar with or without the surroundings and other present avatars. The surroundings and other avatars can be stored in separate layers of the recording.

In yet another embodiment, the caller uses a video call as described in the first embodiment, but the agent is present in a virtual world and represented by an avatar. The avatar calls the queue by selecting it, for example, on a teleport. As the caller is not represented by an avatar, the agent is either teleported to a suitable video screen and there sees the caller, or the video is simply displayed in front of the agent. Video and audio of the agent avatar is grabbed and transmitted to the calling user's video endpoint.

The foregoing discussion discloses merely exemplary embodiments of the present advancement. As will be understood by those skilled in the art, the present advancement may be embodied in other specific forms without departing from the spirit or essential characteristics thereof. Accordingly, the disclosure of the present invention is intended to be illustrative, but not limiting of the scope of the advancement, as well as other claims. The disclosure, including any readily discernible variants of the teachings herein, define, in part, the scope of the foregoing terminology such that no inventive subject matter is dedicated to the public.

The invention claimed is:

1. A method of processing a video call comprising:
   handling an incoming video call from a calling party, said video call being from one of a set of phone numbers, a set of data addresses, and a set of URLs;
   identifying the calling party as one of an agent or a caller in accordance with a predetermined list of agent identities;
   presenting an agent main menu to the calling party, when the calling party is identified as an agent and the calling party is addressing a main queue entry;
   establishing a connection between the calling party and a queued caller, when the calling party is identified as an agent addressing a sub-queue and the queued caller has a first position in said sub-queue;
   presenting a caller main menu to the calling party, when the calling party is identified as a caller and the calling party is addressing the main menu queue;
   creating a virtual queue of callers associated with a sub-queue entry being addressed by the calling party, when the calling party is identified as a caller addressing the sub-queue entry; and
   inserting the calling party into a virtual queue of callers associated with the sub-queue entry the calling party is addressing, when the calling party is a caller addressing the sub-queue entry.

2. The method as defined in claim 1, wherein
   the agent main menu and the caller main menu include selectable options, each selectable option corresponding to a respective sub-queue entry such that by selecting one of the options, the calling party is identified as addressing the sub-queue entry associated with the selected option.

3. The method as defined in claim 1, further comprising: receiving a VideoMail message.

4. The method as defined in claim 3, further comprising: transmitting an indication of VideoMail messages for a specified queue to the agent.

5. The method as defined claim 4, wherein
   a menu is configured to connect the agent to the caller at a time corresponding to one of during playback of the VideoMail message and after playback of the VideoMail message.

6. The method as defined in claim 1, wherein
   a system video call providing information and statistics regarding a finished call with a calling party is transmitted to the agent, and
   a status of the agent is identified as occupied until the system video call is released.

7. The method as defined in claim 1, wherein
   at least one of the caller and agent is represented by an avatar.

8. The method as defined in claim 7, wherein
   a connection of a call is made by placing the caller and agent avatars in a virtual place suited for communication.

9. The method as defined in claim 8, wherein
   a virtual teleporter is used by an avatar choosing a queue.

10. The method as defined in claim 9, wherein the avatar corresponding to the calling party, after choosing a queue or sub-queue, is teleported to a meeting place after an agent avatar is free and in said meeting place.

11. The A method as defined in claim 7, wherein
    the avatar corresponding to the calling party, after choosing a queue or sub-queue, meets with the agent at a place and time determined by the calling avatar.

12. A non-transitory computer-readable storage medium encoded with computer-readable instructions thereon for causing a data processor to execute a method of controlling a video teleconference comprising:
    handling an incoming video call from a calling party, said video call being from one of a set of phone numbers, a set of data addresses, and a set of URLs;
    identifying the calling party as one of an agent or a caller in accordance with a predetermined list of agent identities;
    presenting an agent main menu to the calling party, when the calling party is identified as an agent and the calling party is addressing a main queue entry;
    establishing a connection between the calling party and a queued caller, when the calling party is identified as an agent addressing a sub-queue and the queued caller has a first position in said sub-queue;
    presenting a caller main menu to the calling party, when the calling party is identified as a caller and the calling party is addressing the main menu queue;
    creating a virtual queue of callers associated with a sub-queue entry being address by the calling party, when the calling party is identified as a caller addressing the sub-queue entry; and
    inserting the calling party into a virtual queue of callers associated with the sub-queue entry the calling party is addressing, when the calling party is a caller addressing the sub-queue entry.

13. The non-transitory computer-readable storage medium as defined in claim 12, wherein
    the agent main menu and the caller main menu include selectable options, each selectable option corresponding to a respective sub-queue entry such that by selecting one of the options, the calling party is identified as addressing the sub-queue entry associated with the selected option.

14. The non-transitory computer-readable storage medium as defined in claim 12, wherein
    receiving a VideoMail message.

15. The non-transitory computer-readable storage medium as defined in claim 14, wherein
    transmitting an indication of VideoMail messages for a specified queue to the agent.

16. The non-transitory computer-readable storage medium as defined in claim 15, wherein
    a menu is configured to connect the agent to the caller at a time corresponding to one of during playback of the VideoMail message and after playback of the VideoMail message.

17. The non-transitory computer-readable storage medium as defined in claim 12, wherein
    a system video call providing information and statistics regarding a finished call with a calling party is transmitted to the agent, and
    a status of the agent is identified as occupied until the system video call is released.

18. A video call management device comprising:
    an incoming video call unit configured to handle an incoming video call from a calling party, said video call being from one of a set of phone numbers, a set of data addresses, and a set of URLs;
    a calling party identification unit configured to identify the calling party as one of an agent or a caller in accordance with a predetermined list of agent identities;

a main menu presenting unit configured to
> present an agent main menu to the calling party, when the calling party is identified as an agent and the calling party is addressing a main queue entry, and
> to presenting a caller main menu to the calling party, when the calling party is identified as a caller and the calling party is addressing a main menu queue;

a connection unit configured to establish a connection between the calling party and a queued caller, when the calling party is identified as an agent addressing a sub-queue and the queued caller has a first position in said sub-queue;

a virtual queue unit configured to
> create a virtual queue of callers associated with a sub-queue entry being address by the calling party, when the calling party is identified as a caller addressing the sub-queue entry; and
> insert the calling party into a virtual queue of callers associated with the sub-queue entry the calling party is addressing, when the calling party is a caller addressing the sub-queue entry.

19. The call management device as defined in claim 18, wherein
> the agent main menu and the caller main menu include selectable options, each selectable option corresponding to a respective sub-queue entry such that by selecting one of the options, the calling party is identified as addressing the sub-queue entry associated with the selected option.

20. The call management device as defined in claim 18, further comprising:
> a videomail unit configured to receive a VideoMail message from the caller.

21. The call management device as defined in claim 20, wherein
> The videomail unit is configured to provide the agent with an indication of VideoMail messages for the queue.

22. The call management device as defined claim 21, wherein
> the videomail unit is configured to provide the agent with a menu for calling the caller a time corresponding to one of during playback of the VideoMail and after playback of the VideoMail.

23. The call management device as defined in claim 18, further comprising:
> a system video call unit configured to send the agent a system video call providing information and statistics regarding a finished call with a calling party, and a status of the agent is identified as occupied until the system video call is released.

* * * * *